Patented July 8, 1952

2,602,734

UNITED STATES PATENT OFFICE 2,602,734

METHOD OF RECOVERING SUSPENDED MATERIALS FROM GASES FROM FLASH ROASTING OF ZINC SULFIDE ORES

Carl W. J. Hedberg and Harry L. Richardson, Bound Brook, N. J., assignors to Research Corporation, New York, N. Y., a corporation of New York No Drawing. Application February 5, 1948, Serial No. 6,556

3 Claims. (Cl. 75—1)

This invention relates to a method for recovering suspended material from roaster gases and particularly to an improved method for the electrical precipitation of suspended material contained in gases from the flash roasting of ores, especially sulfide ores such as zinc blende.

The removal of suspended material from gases from the flash roasting of ores, such as zinc sulfide ores, by precipitation in electrical precipitators of the Cottrell type has entailed considerable difficulties. Electrical operation of the precipitators has been erratic and characterized by frequent periods of excessive arcing, and efficiencies of precipitation have been encountered ranging from below 95% to as low as 75%. Both the low efficiencies and the non-uniformity of electrical operation are troublesome and undesirable.

It is an object of the invention to provide a process for conditioning gases from the roasting of sulfide ores prior to electrical precipitation for the purpose of increasing the efficiency of collection of suspended calcined material and improving the general operating characteristics of the electrical precipitator.

We have found that much higher efficiencies of precipitation and much more uniform operation of the electrical precipitators can be obtained by introducing sulfuric acid into the gases from the roasting operation and thereafter subjecting the gases to electrical precipitation, the amount of sulfuric acid introduced into the gases being effective to produce in the material recovered in the precipitation step a water-soluble sulfate content of greater than 6% calculated as sulfur.

The amount of sulfuric acid added to the gases as a conditioning agent may run from about 1.45 grains to about 2.9 grains calculated as H₂SO₄ per cubic foot of gases reduced to N. T. P. (0° C. × 760 mm. of mercury), and preferably is about 2.3 grains per cubic foot N. T. P.

Before the conditioning agent is added to the flash roaster gases, the gases may be cooled or humidified or otherwise pretreated, and they are preferably passed through settling chambers or other mechanical separators, such as cyclones, to remove the coarser suspended particles. Then the sulfuric acid is added and the gases are subjected to electrical precipitation with the improved results herein referred to. The sulfuric acid may, however, be added at any point between the flash roaster and the electrical precipitator.

Although dilute or concentrated aqueous sulfuric acid solution is preferred as the conditioning agent, sulfuric acid of any SO₃ content may be used as well as liquid or gaseous SO₃ itself. Therefore, in this description and in the appended claims, the term "sulfuric acid" is used in a broad sense and includes not only sulfuric acid per se but also the anhydride thereof.

By way of example, in a flash roasting plant operating in the heretofore conventional manner on zinc sulfide ore, the collection efficiency from the electrical precipitators ranged from 40% to 95% over a period of approximately nine years. Normal operational recoveries were from 70% to 80% with a maximum voltage which could be impressed across the precipitator electrodes of from 25 kv. to 35 kv.; at higher voltages erratic operation with arcing occurred.

Sulfuric acid, in the amount of 2.32 grains per cubic foot of gas at N. T. P., was injected into the flash roaster gases flowing to the electrical precipitators at a rate of 20,000 cubic feet per minute and at a temperature of 300° F. Such conditioning treatment increased the water-soluble sulfate sulfur content of the collected material from a range of from 4.0% to 4.5% to a range of from 9.0% to 11.0%. A maximum available voltage of 55 kv. was continuously impressed across the precipitator electrodes without arcing and a current flow of 20 amp. to 40 amp. flowed in the circuit. The collection efficiency averaged 96.6% under such conditions.

Not only does the present process improve precipitator operation and collection efficiency but it also yields a collected product extremely low in chlorine content. The product of low chlorine content is especially desirable in the manufacture of electrolytic zinc where high chlorine content deleteriously affects the lead cathodes of the electrolytic cells and causes lead contamination of the deposited metal.

In the absence of conditioning by the method of the present invention, the collected roasted ore normally contains from 3% to somewhat less than 6% of water-soluble sulfate sulfur. The conditioning method of the present invention raises the water-soluble sulfate sulfur content of the collected material to a value greater than 6%. Preferably sufficient sulfuric acid is added to the flash roaster gases so that a small amount of unreacted sulfuric acid leaves the electrical precipitator with the cleaned exhaust gases.

We claim:

1. The method of recovering suspended materials from the gases from the flash roasting of zinc sulfide ores which comprises injecting sulfuric acid into the gases from the flash roasting operation, which gases contain in suspension roasted particles of zinc sulfide ore having a chlorine content, and thereafter substantially removing said suspended particles and said sulfuric acid from the gases by subjecting the gases to electrical precipitation, the amount of sulfuric acid injected into said gases being effective to produce in the material recovered in said precipitation step a water-soluble sulfate content of greater than 6% calculated as sulfur and a substantially reduced chlorine content.

2. The method of recovering suspended materials from the gases from the flash roasting of zinc sulfide ores which comprises injecting sulfuric acid into the gases from the flash roasting operation, which gases contain in suspension roasted particles of zinc sulfide ore having a chlorine content, and thereafter substantially removing said suspended particles and said sulfuric acid from the gases by subjecting the gases to electrical precipitation, the amount of sulfuric acid injected into said gases being effective to produce in the material recovered in said precipitation step a water-soluble sulfate content of greater than 6% calculated as sulfur and a substantially reduced chlorine content, the cleaned exhaust gases from said precipitation step containing a small amount of unreacted sulfuric acid.

3. The method of recovering suspended material from the gases from the flash roasting of sulfide ores which comprises introducing sulfuric acid into the gases from the flash roasting operation, which gases contain in suspension roasted particles of sulfide ore having a chlorine content, and thereafter substantially removing said suspended particles and said sulfuric acid from the gases by subjecting the gases to electrical precipitation, the amount of sulfuric acid introduced into said gases being effective to produce a substantially reduced chlorine content in the material recovered in said precipitation step.

CARL W. J. HEDBERG.
HARRY L. RICHARDSON.

REFERENCES CITED

The following references are of record in the file of this patent:

UNITED STATES PATENTS

| Number | Name | Date |
| --- | --- | --- |
| 1,329,817 | Wolcott | Feb. 3, 1920 |
| 1,441,713 | Prosser | Jan. 9, 1923 |

FOREIGN PATENTS

| Number | Country | Date |
| --- | --- | --- |
| 361,265 | Great Britain | Nov. 19, 1931 |